Oct. 16, 1956

L. O. REICHELT ET AL 2,767,301

BRAZING FIXTURE

Filed June 29, 1954

INVENTOR
L. O. REICHELT
H. F. RUNGE
BY C. B. Hamilton
ATTORNEY

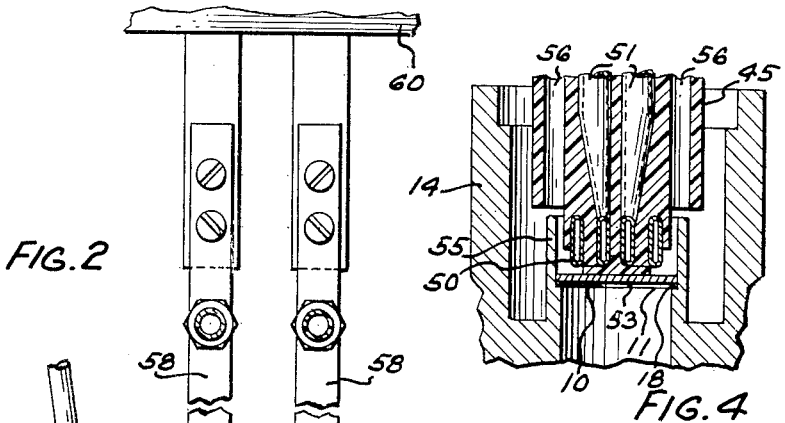
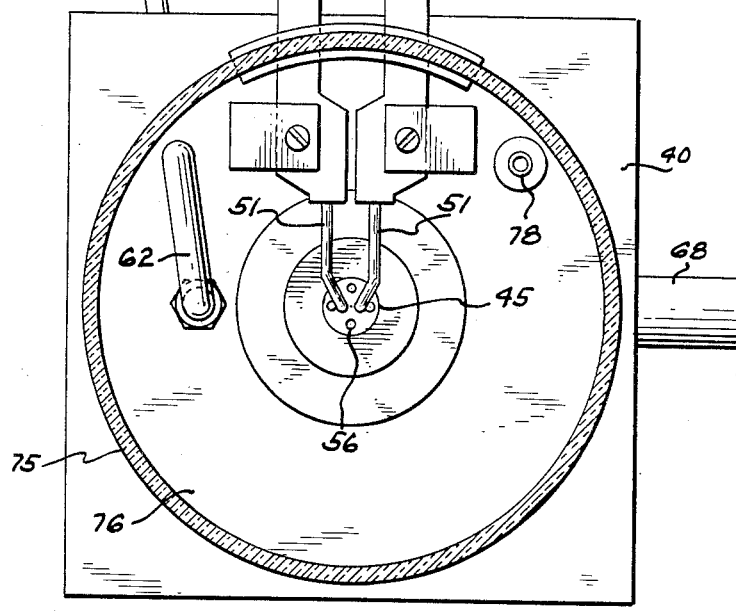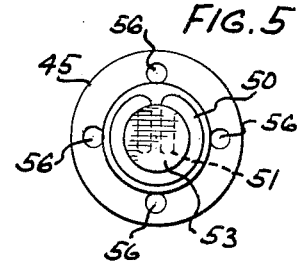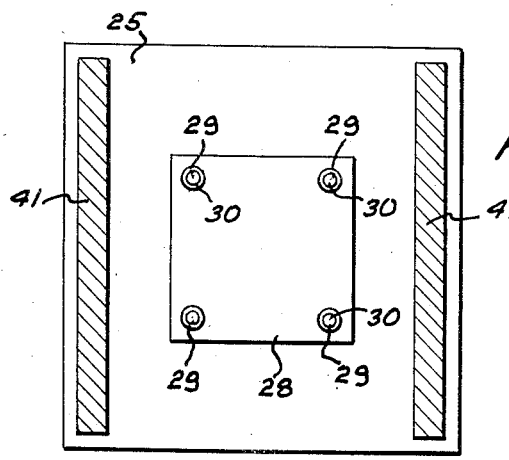

United States Patent Office 2,767,301
Patented Oct. 16, 1956

2,767,301

BRAZING FIXTURE

Lester O. Reichelt, St. Paul, Minn., and Heinz F. Runge, Chicago, Ill., assignors to Western Electric Company, Incorporated, New York, N. Y., a corporation of New York Application June 29, 1954, Serial No. 439,972

7 Claims. (Cl. 219—85)

This invention relates to brazing fixtures and more particularly to a device for brazing a closure disc on a seat in a magnetron.

An object of the invention is to provide a quick acting fixture for brazing a closure disc to a magnetron.

A further object of the invention is to provide a fixture for brazing a part to the interior of a hollow article and for evacuating the hollow article and supplying an inert gas to the parts being brazed.

A further object of the invention is to provide a fixture for brazing a part to the interior of a hollow article and for urging the member and the hollow article towards a fixed induction heating coil depending from a brazing apparatus enclosed in a dome of inert gas.

Another object of the invention is to provide a brazing device for brazing a part to the seat of a hollow article and having a chamber with an opening for slidably receiving a portion of the hollow article therein for establishing a substantially gastight connection therewith and permitting the flow of an inert gas from the chamber into the interior of the article and permitting the movement of the article into engagement with the part as the brazing material between the seat and the part is fused.

A fixture illustrating certain features of the invention for brazing a closure disc to a seat in an open end of a magnetron may include a stationary plate having a socket for slidably receiving the open end of the magnetron and forming a substantially airtight seal therewith, and a movable holder for supporting a magnetron thereon and for yieldably urging the magnetron to a brazing position with the closure disc in engagement with an abutment member of electrical and heat insulating material which is secured to the plate and encloses an induction heating coil. The coil is connectible to a high frequency current source and is disposed adjacent the disc and portions of the magnetron for heating them and a ring of brazing material to effect the brazing of the closure disc seat to the magnetron. A spring pressed closure for closing a laterally disposed opening of the magnetron is provided on the fixture which also has means engageable with a tubulation on the magnetron for evacuating the atmosphere from the interior thereof and also has means including a passageway through the abutment member for supplying inert gas to the interior of the magnetron to prevent oxidation during the brazing operation.

Other objects and advantages of the invention will become apparent by reference to the following detailed description and the accompanying drawings illustrating a preferred embodiment thereof, in which:

Fig. 2 is a plan sectional view of the fixture taken on the line 2—2 of Fig. 1;

Fig. 3 is a reduced plan sectional view taken on the line 3—3 of Fig. 1;

Fig. 4 is an enlarged fragmentary view of a portion of the fixture with the end portion of the magnetron in engagement therewith; and Fig. 5 is a bottom view of the induction heating coil.

Figure 1:
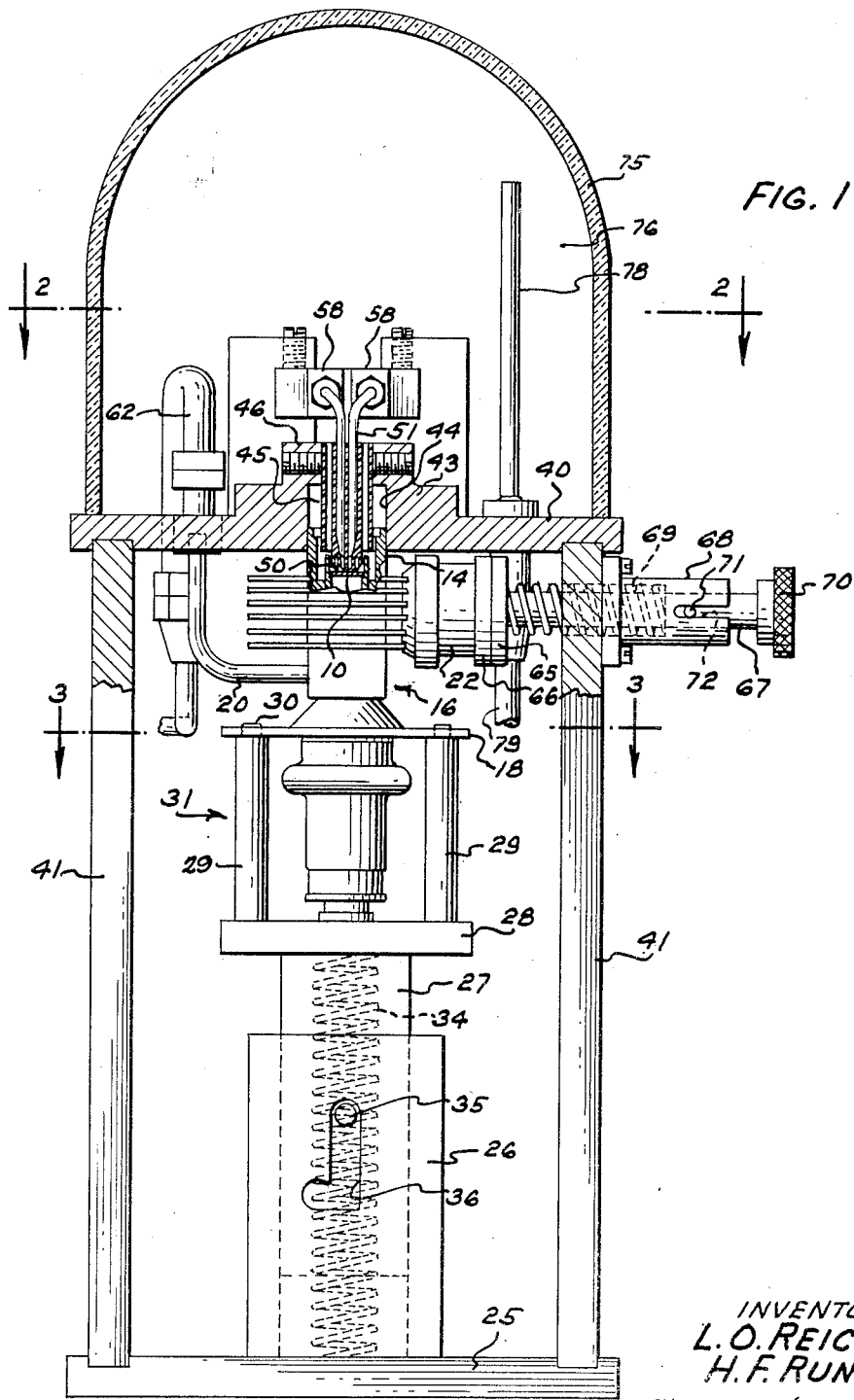
Fig. 1 is a vertical sectional elevational view of the fixture with a magnetron supported therein in brazing position.

The present fixture was designed to braze a closure disc 10 to a seat 11 in the interior of an open end portion or pole piece 14 of a magnetron 15. A ring of brazing material 17 is interposed between the disc 10 and the seat 11 prior to the brazing operation. The magnetron has a mounting plate 18 fixed thereto, and it has a tubulation 20 thereon communicating with the interior thereof by means of which the atmosphere within the magnetron may be evacuated. Extending laterally from the magnetron is a hollow or apertured output component 22.

The fixture comprises a base 25 having a cylindrical guide 26 thereon for supporting a hollow plunger 27 for vertical movement. On the upper end of the plunger 27 is mounted a supporting plate 28 which has four vertical posts 29 fixed thereto and extending upwardly therefrom and the upper reduced ends 30 thereof form shoulders and fit into apertures in the mounting plate 18 for supporting the magnetron thereon in a vertical position as shown in Fig. 1. The elements 27, 28, and 29 form a holder 31 for the magnetron which is vertically movable and is urged upwardly by a spring 34 disposed within the hollow plunger 27. A handle in the form of a rod 35 fixed to the plunger 27 and slidable in a bayonet slot 36 in the guide 26 may be manually actuated to effect the raising and lowering movement of the holder 31 and the magnetron 16 thereon and to lock it in its lower position.

The holder 31 serves to yieldably urge the magnetron upwardly toward a stationary supporting plate 40 fixed to the upper end of a pair of frame plates 41 which are spaced apart from each other and secured to the base 25. The supporting plate 40 has a centrally disposed boss or upwardly extending portion 43 in which is formed a recess or socket 44 having a cross section conforming to the open end or pole piece 14 of the magnetron and for slidably receiving said portion 14 therein as shown in Fig. 1 and forming a substantially airtight seal therewith.

A cylindrical abutment member 45 is secured in an aperture in the boss 43 by a pair of screws 46 and has an end surface 47 against which the disc 10 is pressed during the brazing operation. The abutment member 45 is made from an electrical insulating plastic material molded around a hollow induction heating coil 50, the hollow leads 51 of which extend upwardly through the member 45. The reduced end portion of the member 45 and the end surface 47 extends below the coil 50 to space the disc 10 from the coil. The member 45 is adapted to extend into the recess of the pole piece 14 of the magnetron and the lower portion thereof is reduced to approximately the diameter of the coil 50 which is relatively small and is adapted to fit within a sleeve portion 55 of the magnetron as shown in Fig. 4. A plurality of vertically extending passageways 56 are formed in the member 45 to permit an inert gas to be directed therethrough into engagement with the disc 10 and the adjacent portions of the magnetron heated by the coil 50 during the brazing operation.

The leads 51 of the coil are connected to a pair of horizontally disposed terminals 58 which are supported by brackets of insulating material 59 on the supporting plate 40 and are connected to a device 60 for supplying high frequency current thereto. The coil 50, leads 51 and terminals 58 are hollow and have a coolant circulated therethrough. As the magnetron 16 is raised from its lower position to its upper or brazing position the end of the tubulation 20 is guided into a socket in the end of a conduit 62 and establishes a substantially airtight seal therewith. The conduit 62, in the form of a U-shaped loop, is mounted on the supporting plate 40 and connectible to a vacuum line for evacuating the atmosphere from the interior of the magnetron.

A closure member 65 having a flat resilient sealing disc 66 thereon is mounted on a rod 67 for engagement with the end of the output component 22 on the magnetron to close the opening therein while the atmosphere is being evacuated from the interior of the magnetron. The rod 67 is slidably mounted in a sleeve 68 on one of the frame plates 41, and a spring 69 urges the closure member 65 into engagement with the component 22 of the magnetron. A knob 70 is provided on the rod 67 to permit retraction of the closure member, and a pin 71 cooperating with a slot 72 in the sleeve 68 and with the end of the sleeve serves to hold the closure member 65 in its retracted position.

Means are provided for supplying an inert gas to the interior of the magnetron during the brazing operation. A dome 75 of transparent plastic material is mounted on the supporting plate 40 and forms an airtight seal therewith for enclosing portions of the plate and coil to form a chamber 76 into which the inert gas may be flowed. A nozzle 78 fixed to the supporting plate 40 and extending upwardly therefrom into the chamber 76 is connected at its lower end to a conduit 79, which in turn is connected to a supply of inert gas (not shown) which maintains a supply to the chamber 76 as directed under control of the operator and the control mechanism as shown. The gas in the chamber 76 will flow through the passageways 56 in the member 45 into a relatively small chamber formed by the recess 44 and into engagement with portions of the magnetron adjacent the heating coil 50 and provide an inert atmosphere around the parts of the magnetron being heated during the brazing operation.

Thus, when it is desired to braze the disc 10 onto the seat 11 of the magnetron 16 the ring of brazing material 17 is applied to the seat and the disc applied to the ring. The magnetron may then be applied to the holder 31 when it is in its lower position, after which the handle 35 may be manipulated to unlock the holder and permit it to be raised by the spring 34 to its upper position as shown in Fig. 1 with the end of the tubulation 20 sealed to the conduit 62, the upper pole piece 14 disposed within the recess 44, and with the disc 10 engaging the surface 47 of the abutment member 45 adjacent the coil 50. The closure member 65 may then be moved into engagement with the end of the output portion 22 of the magnetron and the vacuum applied to the conduit 62 to evacuate the atmosphere from the interior of the magnetron. The atmosphere within the chamber 76 will also be withdrawn therefrom through the conduit 62. After the air has been withdrawn from the chamber 76 the inert gas is flowed thereinto through the nozzle 78 to fill the recess 44 and the spaces around the parts of the magnetron which will be heated during the brazing operation and thus prevent oxidation of the surface thereof. The high frequency current is then connected to the induction heating coil for a predetermined length of time sufficient to heat the disc 10 and the sleeve portion 55 of the magnetron to a predetermined temperature and to fuse the ring of brazing material 17 whereupon the spring 34 serves to move the magnetron 16 upwardly until the seat 11 thereof is pressed against the disc 10 and held there until the brazing operation is completed and the parts are cooled to a point where the brazing material 17 hardens. The flow of inert gas may then be stopped, the closure member 65 may be retracted, and the handle 35 manipulated to move the holder 31 and the magnetron 16 to its lower position, after which the magnetron with the disc 10 brazed thereto may be removed from the fixture.

This construction of having the brazing apparatus mounted in the dome 75 of inert gas with the induction coil 50 depending from the plate 40 permits the magnetron parts to be quickly brought into position without disturbing or adjusting the stationary brazing apparatus enclosed in the inert atmosphere inside the dome.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A fixture for brazing a part onto a seat of an end portion of an article comprising a member having a recess for slidably receiving said end portion of the article for effecting a substantially airtight seal therewith and forming a chamber communicating with said end portion, an element of electrical insulating material secured to said member and disposed in said recess and having an end surface engageable with said part on the seat of said article, an induction heating coil imbedded in said element adjacent and in spaced relation to said end surface, means for supporting said article with said end portion thereof in said recess and for urging said article toward said element, and means for supplying an inert gas to said chamber.

2. A fixture for brazing a closure disc onto a seat in an open end portion of a magnetron comprising a stationary member having a recess for slidably receiving the open end portion of the magnetron for effecting a substantially airtight seal therewith and to form a chamber communicating with the interior of said end portion of said magnetron, an element of electrical insulating material secured to said stationary member and disposed in said recess in a position to extend into the open end of the magnetron and engage the disc therein, an induction heating coil imbedded in said element and connectible to a source of current, means for supporting said magnetron with said end portion thereof in said recess and for urging said magnetron toward said element, means for evacuating the atmosphere from the interior of said magnetron, means for supplying an inert gas to said chamber, and means for energizing the induction coil.

3. A fixture for brazing a closure disc onto a seat of an end portion of a magnetron comprising a member having a recess for slidably receiving said end portion of the magnetron for effecting a substantially airtight seal therewith and forming a chamber communicating with the interior of said end portion of the magnetron, an induction heating coil connectible to a source of high frequency current, means for mounting said coil on said member and in said recess and for providing an abutment surface adjacent to and spaced a predetermined distance from the end of said coil, said abutment surface being engageable with said closure disc for positioning it adjacent the coil during the brazing operation, a holder for supporting said magnetron with said end portion thereof in the recess of said member, means for effecting relative movement between said holder and said supporting member and for urging said coil and said magnetron towards each other, and means for supplying an inert gas to said chamber.

4. A fixture for brazing a closure disc onto a seat of an end portion of a hollow article comprising a member having a recess for slidably receiving the end portion of the article for effecting a substantially airtight seal therewith and forming a chamber communicating with said end portion, an induction heating coil connectible to a source of high frequency current, means for mounting said coil on said member in said recess, means providing an abutment surface adjacent to and spaced a predetermined distance from the end of said coil and engageable with said closure disc for positioning it adjacent the coil during the brazing operation, a holder for supporting said magnetron with said end in the recess of said member, means for effecting the relative movement between said holder and said member and for urging said coil and said article towards each other, means for evacuating the atmosphere from said article, and means for supplying an inert gas to said chamber.

5. A fixture for brazing a part onto a seat of an open end portion of a magnetron comprising a plate having a recess for slidably receiving said open end of the magnetron for effecting a substantially airtight seal therewith, a holder mounted for movement toward and away from said plate for supporting said magnetron with said end portion in said recess, means for urging said holder toward said plate, an induction heating coil connectible to a source of current, means mounting said coil in said recess in a position to fit within the open end portion of said magnetron, means on said plate engageable with said part within the end portion of the magnetron for positioning said part in a predetermined position adjacent to and in spaced relation to said coil, means mounted on said plate and cooperating therewith to form a chamber communicating with said recess, means connectible to the magnetron below said plate for evacuating the air therefrom, and means for supplying inert gas to said chamber.

6. A fixture for brazing a part onto a seat of an open end portion of a hollow article comprising a plate having a recess for slidably receiving said open end of the article for effecting a substantially airtight seal therewith, a holder mounted for movement toward and away from said plate for supporting said article with said end portion in said recess, means for urging said holder toward said plate, an abutment member of insulating material mounted on said plate in said recess and adapted to fit within the open end of said article and having an end surface engageable with the part therein, an induction heating coil embedded in said abutment member adjacent to and in spaced relation to the end surface thereof, a dome mounted on said plate and cooperating therewith to form a chamber communicating with said recess, means for evacuating the air from the article, and means for supplying inert gas to said chamber.

7. In a fixture for brazing a part to an internal seat of a hollow article, the combination of a stationary plate having an opening for slidably receiving a portion of the hollow article for establishing a substantially airtight seal therewith, an induction heating coil connectible to a source of current and disposed in said opening, a dome seating on said plate and cooperating therewith to form a chamber communicating with said opening and enclosing a portion of said coil, a freely accessible elevating mechanism for carrying the hollow article to and from the plate, resilient means for stressing the elevating mechanism toward the plate to maintain the article with said portion thereof in the opening in said plate, means mounted on said plate and engageable with the part within said article for stopping the movement thereof and for positioning the part in a predetermined close relation to said coil, means for evacuating the air from said article, and means for supplying inert gas to the interior of said article.

References Cited in the file of this patent

UNITED STATES PATENTS

| | | |
|---|---|---|
| 2,394,984 | Claussen | Feb. 19, 1946 |
| 2,428,610 | Beggs | Oct. 7, 1947 |
| 2,657,298 | Andrus | Oct. 27, 1953 |